United States Patent [19]

Russo

[11] 4,420,053

[45] Dec. 13, 1983

[54] FORK LIFT WEIGHING APPARATUS

[75] Inventor: Frank J. Russo, Warren, Ohio

[73] Assignee: Litco International Inc., Vienna, Ohio

[21] Appl. No.: 294,781

[22] Filed: Aug. 20, 1981

[51] Int. Cl.³ .................... G01G 19/08; G01G 23/06
[52] U.S. Cl. .................................. 177/139; 177/189
[58] Field of Search .................... 177/139, 187, 189

[56] References Cited

U.S. PATENT DOCUMENTS

| | | | |
|---|---|---|---|
| 2,935,213 | 5/1960 | Cellitti et al. | 177/139 X |
| 3,063,576 | 11/1962 | Hofmeister | 177/139 X |
| 4,184,555 | 1/1980 | Maltby et al. | 177/189 X |

Primary Examiner—George H. Miller, Jr.

[57] ABSTRACT

This invention relates to improved weighing apparatus for fork lifts comprising a weigh bridge supported at each end thereof by load cells. The weigh bridge and load cells are built into the fork so that the overall height of the fork is kept to a minimum.

3 Claims, 4 Drawing Figures

FORK LIFT WEIGHING APPARATUS

PRIOR ART

The provision of weighing means is not a new concept as evidenced by the following U.S. Pat. Nos.
2,757,923 Lefsheik
2,935,213 Cellitti et al
3,059,710 Pien
3,063,576 Hofmeister
3,431,992 Whitecar The present invention is an improvement over the weighing apparatus disclosed in Cellitti U.S. Pat. No. 2,935,213. In the system disclosed by Cellitti each tine is provided with a longitudinal depression in its upper surface similar to the cavity in the tine of the present invention. The similarity of the two structures ends here.

In Cellitti et al each tine is provided with front and rear bearing plates. Such structure substantially increases the height of the tine and prevents its use with certain load pallets.

The load cell asemblies of Cellitti, of which there are four, each comprises a pair of cylinders having strain gages mounted interiorly thereof. The manner in which these are mounted in the fork tines makes them vulnerable to damage incurred by the conventional hard use fork trucks are submitted to.

The prior art weighing systems for fork lift apparatus have many disadvantages. Some require substantial changes in the structure of the vehicle itself, for example the system of U.S. Pat. No. 3,063,576.

Some systems are very expensive and not easily applied to existing vehicles such as the hydraulic system shown by U.S. Pat. No. 3,431,992.

The apparatus of Cellitti has some of the advantages of the present invention, but it is subject to some disadvantages such as vulnerable to vertical impact loads on the load cells. Also the overall height of the fork is increased to a degree whereby the fork cannot be inserted under the load in many instances.

It is an object of this invention to provide weighing means for fork lifts which overcomes the above described problems.

It is a further object of the invention to provide weighing means for a fork lift wherein the entire weighing structure is substantially enclosed within the fork.

These and other objects will become readily apparent from the following description and the drawings in which.

Figure 1:
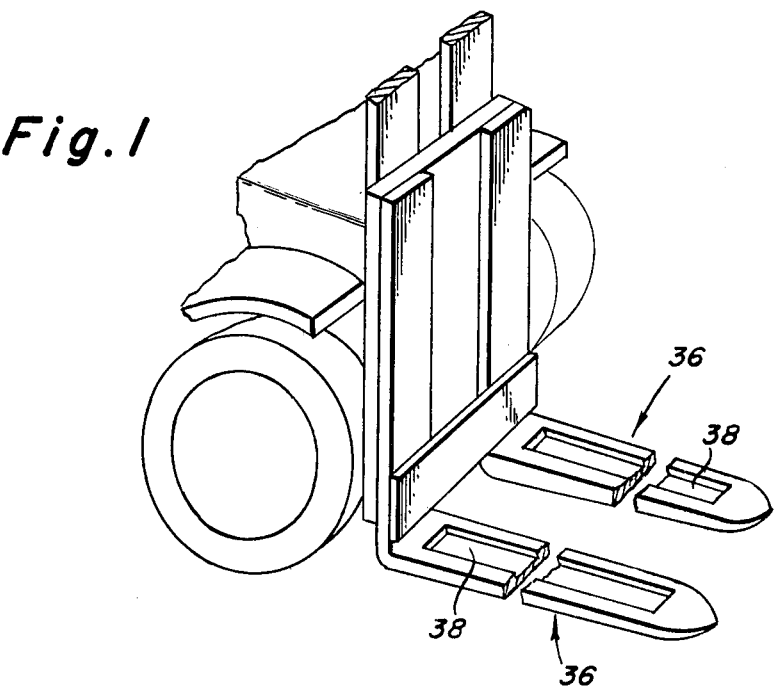
FIG. 1 is perspective view of a pair of forks attached to a fork lift vehicle.
Figure 3:
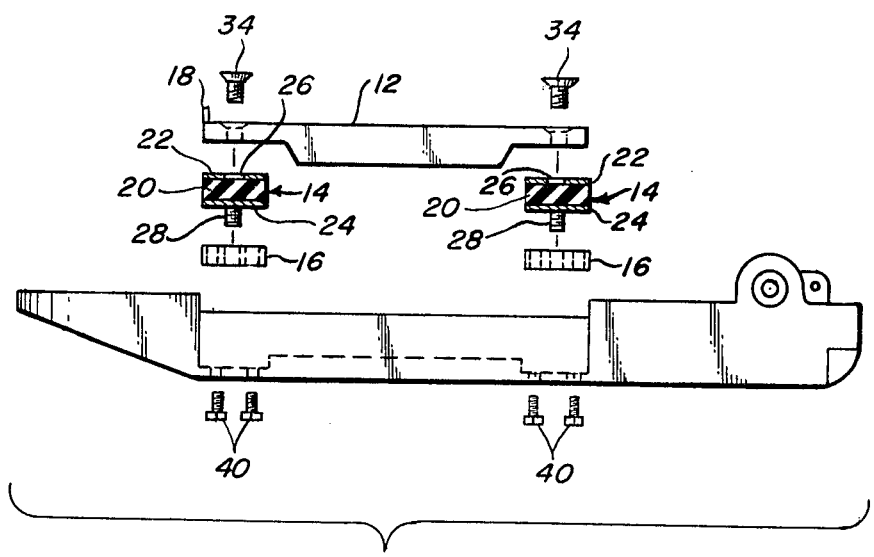
FIG. 3 is a side elevational view of a single fork and the disassembled components of the weighing means.
Figure 2:
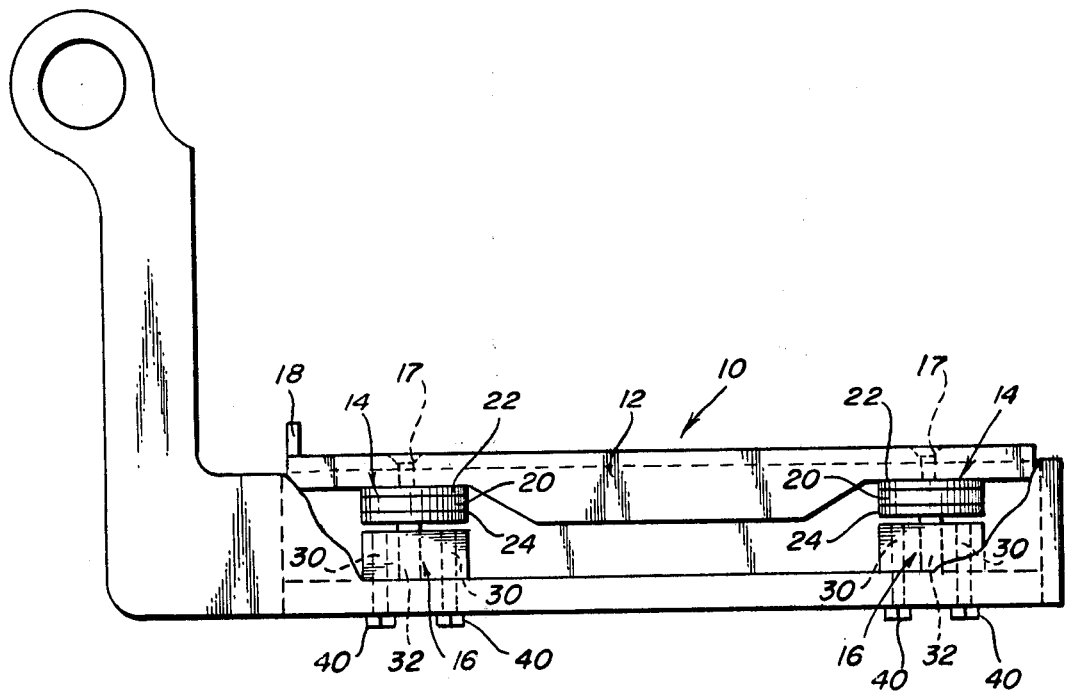
FIG. 2 is a side elevational view, partially broken away, of a single fork with the weighing means secured therein.
Figure 4:
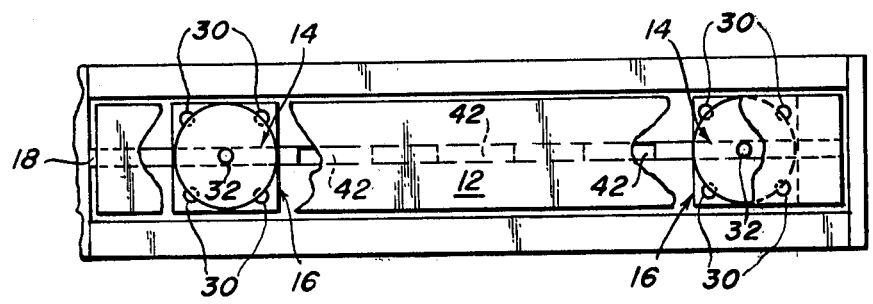
FIG. 4 is a plan view of a single fork.

Describing the invention, more specifically, reference is made to the drawings in which the weighing means 10 comprises a weigh bridge 12, a pair of shock absorbers 14, and a pair of load cells 16. The weigh bridge 12 is formed of hard steel and is provided with an upstanding tab 18 at one end thereof, the function of which will be described below. The weigh bridge 12 is substantially rectangular in cross section and the thickness thereof is reduced at each end thereof to receive the shock absorbers 14. A countersunk hole 17 is provided at each end thereof.

The shock absorbers 14 are each formed of a disc of hard rubber 20 having a first disc of hard steel 22 bonded to one surface and a second disc 24 of hard steel bonded to the other surface. The disc 22 is provided with a threaded opening 26 at its center and the disc 24 is provided with a threaded stud 28 secured thereto at its center.

The load cell 16 is formed in the shape of a rectangular block and is provided with threaded openings 30 at each corner thereof and a further opening 32 in the center thereof. Commercially available load cells may be used.

The weighing means 10 is assembled by attaching the shock absorbers 14 to the shallow portions of the bridge 12 by bolts 34 extending through the holes 17 and threadably engaging the openings 26. The load cells 16 are then screwed onto the studs 28.

The forks 36 are of conventional design and detailed description thereof is not deemed necessary. Each fork 36 is provided with an elongated cavity 38 of sufficient length to receive the weigh bridge 12.

The weighing means is lowered into the cavity 38 and secured therein by a plurality of bolts 40 extending through openings in the bottom of the fork and engaging the threaded openings 30 in the load cells 16. The bottom wall of the fork 36 is provided with a plurality of openings 42 to permit drainage of any fluid that might collect in the cavity 38.

Each load cell 16 is electrically connected to readout means located in a convenient plate on the fork lift vehicle.

It will now be understood that the over all height of the fork is not appreciably increased by the structure of the present invention. The upstanding tab 18 on the weigh bridge 12 serves to locate properly the load on the forks to obtain an accurate measurement. The load cells 16 are protected by the shock absorbers 14 from damage due to any impact forces.

The weighing means 10 may be used with conventional forks merely by making a cavity therein by known methods.

What is claimed is:

1. A fork lift assembly having a plurality of load supporting tines, and each tine being provided with weighing means, the improvement comprising a tine having an elongated cavity therein, weighing means supported in said cavity, the over all height of said weighing means being only slightly greater than the depth of said cavity, said weighing means comprises a weigh bridge having an upper surface adapted to receive a load, a shock absorber secured to the bottom surface at each end thereof, and a load cell secured to each end thereof, and fastening means extending through openings in the bottom wall of the cavity for securing said weighing means therein.

2. A fork lift assembly as set forth in claim 1 wherein each weigh bridge is provided with a stop member at one end thereof.

3. A fork lift assembly as set forth in claim 1 wherein the bottom wall of said cavity is provided with drain means.

* * * * *